(12) United States Patent
Wright et al.

(10) Patent No.: US 9,646,020 B2
(45) Date of Patent: May 9, 2017

(54) INTEGRATED FORMAT CONVERSION DURING DISK UPLOAD

(75) Inventors: Eron D. Wright, Sammamish, WA (US); Ismet Erensoy Kahraman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 13/462,449

(22) Filed: May 2, 2012

(65) Prior Publication Data

US 2013/0297722 A1 Nov. 7, 2013

(51) Int. Cl.
| | | |
|---|---|---|
| *G06F 11/14* | (2006.01) | |
| *G06F 17/30* | (2006.01) | |
| *H04L 29/06* | (2006.01) | |
| *H04L 29/08* | (2006.01) | |

(52) U.S. Cl.
CPC .... *G06F 17/30194* (2013.01); *G06F 11/1469* (2013.01); *G06F 17/30286* (2013.01); *G06F 17/30595* (2013.01); *H04L 65/602* (2013.01); *H04L 67/06* (2013.01)

(58) Field of Classification Search
CPC .......... H04L 12/5694; H04L 2007/045; H04L 65/608; H04L 67/2842; H04L 69/22
USPC ....... 709/201, 203, 217, 218, 219, 223, 224, 709/225, 226
See application file for complete search history.

(56) References Cited

U.S. PATENT DOCUMENTS

| | | | |
|---|---|---|---|
| 2005/0086256 A1* | 4/2005 | Owens | G06F 17/30595 |
| 2007/0076764 A1* | 4/2007 | Kawada | H04H 20/28 |
| | | | 370/503 |
| 2007/0121678 A1* | 5/2007 | Brooks | H04L 12/2801 |
| | | | 370/505 |
| 2007/0162487 A1 | 7/2007 | Frailey | |
| 2008/0159622 A1* | 7/2008 | Agnihotri et al. | 382/157 |
| 2008/0243860 A1* | 10/2008 | Cannon | G06F 3/0608 |
| 2009/0030960 A1* | 1/2009 | Geraghty et al. | 708/203 |
| 2009/0031199 A1* | 1/2009 | Luby | H03M 13/29 |
| | | | 714/800 |
| 2009/0172431 A1* | 7/2009 | Gupta | G06F 13/102 |
| | | | 713/320 |
| 2010/0189122 A1* | 7/2010 | Dandekar | H04L 65/602 |
| | | | 370/412 |
| 2010/0262797 A1* | 10/2010 | Rosikiewicz | G06F 11/1469 |
| | | | 711/162 |
| 2012/0197868 A1* | 8/2012 | Fauser | G06F 17/30286 |
| | | | 707/714 |
| 2013/0121600 A1* | 5/2013 | Lin et al. | 382/224 |
| 2013/0247199 A1* | 9/2013 | Kuo | G06F 21/561 |
| | | | 726/24 |

OTHER PUBLICATIONS

Author Unknown, "Direct Automatic Conversion Method," Retrieved Jan. 19, 2009 from http://documentation.hwdmediashare.co.uk/wiki/Direct_Automatic_Conversion_Method.

(Continued)

*Primary Examiner* — Barbara Burgess
(74) *Attorney, Agent, or Firm* — Workman Nydegger (57) ABSTRACT

Uploading storage data. A method includes determining a file protocol for a local file including determining sparseness for the local file. Based on the sparseness for the local file, the local file is uploaded to a remote service, while preserving sparseness by not uploading data that the remote service can imply based on the sparseness.

22 Claims, 5 Drawing Sheets

(56) References Cited

OTHER PUBLICATIONS

Author Unknown, "How to Convert VMKD Virtual Hard Disks to Amazon Elastic Compute Cloud (EC2) AMI Format," Published May 22, 2009. http://www.dedoimedo.com/computers/amazon-ec2.html.
Debelijak, L., "System Center 2012 App Controller: Managing On-Premise and Cloud Together," Published Oct. 29, 2011. http://blogs.msdn.com/b/lukad/archive/2011/10/29/system-center-2012-app-controller-managing-on-premise-and-cloud-together.aspx.
Author Unknown, "Turbine Video Engine SDK Version 4," Published May 13, 2006. http://www.blue-pacific.com/products/turbinevideosdk/.
Rick, C., "Vid.ly = Upload Video, Grab URL, Play on Almost Every Connected Device," Retrieved Mar. 14, 2012 from http://www.reelseo.com/vidly/.
Lemire, D., "Converting PowerPoint Slides," Published Nov. 19, 2007. http://www.strandvision.com/powerpoint_conversion.html.
Author Unknown, "The WVZ Web-Based Flash 8 FLV Web Video Converter," Published Dec. 6, 2006. http://www.webvideozone.com/public/288.cfm.

\* cited by examiner

INTEGRATED FORMAT CONVERSION DURING DISK UPLOAD

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, etc. are provided (for example, through a rental agreement) over a network, such as the Internet.

To use cloud computing, a user uploads their data to a cloud service, such as Windows Azure® from Microsoft® Corporation, or Amazon EC2 available from Amazon.com Inc. of Seattle Wash. Virtual machines are then set-up for the user at the cloud system using the user's uploaded data.

Different cloud systems use different virtual hard disk formats. For example, Windows Azure® cloud uses a specific virtual hard disk format, both for simplicity and to maximize performance at runtime. The particular format for Windows Azure® is known as "Virtual Hard Disk Image Format, version 1.0, fixed variant".

Each virtual disk is stored as a blob in cloud storage. Users may use any appropriate tool to upload the blob, so long as the blob is in the prescribed format for the cloud service. This may require the user to convert their virtual hard disks stored locally to the prescribed format prior to uploading them to the cloud service. For example, the local format may include sparseness optimizations. For example, a local disk may be implemented as a dynamic disk format, which includes a block allocation table (BAT). The block allocation table is able to identify blocks which contain data and blocks which do not contain data, or contain nulls. The blocks containing nulls use little to no storage space, in that they are simply identified as blocks containing nulls. However, the format of the cloud service is typically not in an format optimized for sparseness data functionality as performance is often more important and referencing a block allocation table may result in a performance hit. Thus at the cloud service, actual storage blocks will be implemented containing nulls. Thus, to upload a virtual hard disk file which includes sparseness optimizations to a remote cloud stored blob which does not include sparseness optimizations, a conversion of the local format to the cloud format is performed, in advance of the upload. Previously however, this resulted in blocks containing no data, which were previously not stored locally due to the sparseness optimizations, being created and uploaded to the cloud service. This resulted in data blocks with nulls which have lower or no value using precious bandwidth and computing resources as they are created and uploaded to the cloud service.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed or cloud computing environment. The method includes acts for uploading storage data. The method includes determining a file protocol for a local file including determining sparseness for the local file. Based on the sparseness for the local file, the local file is uploaded to a remote service, while preserving sparseness by not uploading data that the remote service can imply based on the sparseness.

Another method may be practiced in a distributed or cloud computing environment. The method includes acts for efficiently receiving uploaded storage data at a remote service by not requiring null data from a local system to be uploaded. The method includes creating a blob at the remote service. Creating the blob at the remote service comprises initializing a plurality of data blocks in the blob, where the data blocks are initialized to null data. The method further includes receiving a local file having sparseness from a local system by receiving data blocks of the file that contain more than null data while not receiving one or more data blocks of the local file that only contain null data, such that the remote service receives data blocks that it cannot imply based on the sparseness of the local system. The sparseness includes one or more data blocks having only null data. The method further includes writing the received data blocks of the file that contain more than null data to corresponding data blocks in the blob.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

While tools exist to convert a variety of disk formats into prescribed formats for cloud services, some embodiments described herein integrate conversion into a platform-supplied upload tool. The conversion occurs on-the-fly while the upload proceeds. This may provide efficiency and convenience for the user.

Figure 1:
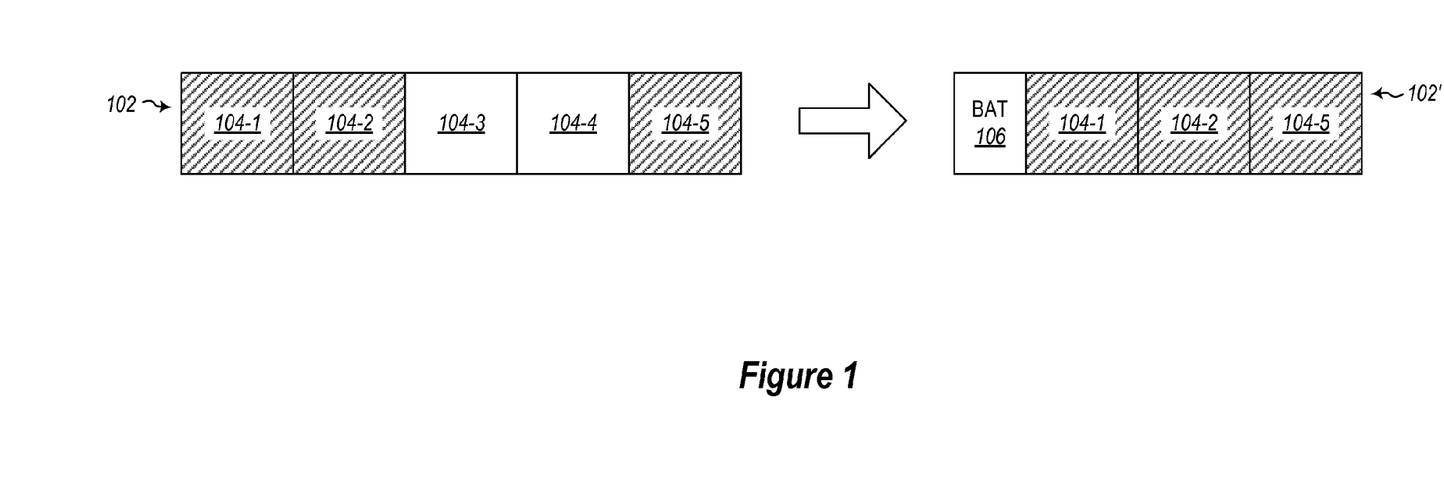
FIG. 1 illustrates a representation of virtual hard disks including one with sparseness optimizations and one without sparseness optimizations.
Figure 2:
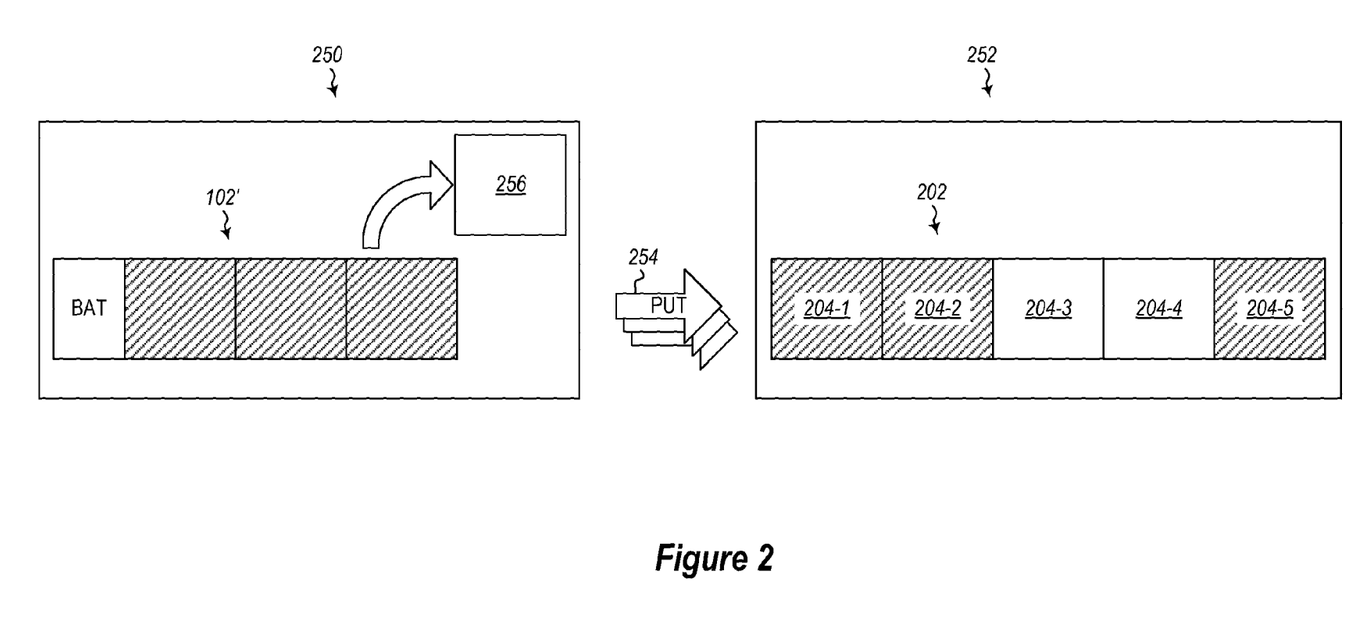
FIG. 2 illustrates a virtual hard disk at a local service and a corresponding blob at a remote service.

As noted above, an aspect of virtual hard disks is that the content is typically sparse. That is, the virtual stream of information contains large pockets of emptiness. An example is illustrated in FIG. 1. FIG. 1 illustrates a representation of a virtual hard disk 102. The virtual hard disk 102 includes five blocks 104-1 through 104-5. Three of the blocks 104-1, 104-2, and 104-5 contain data. The other two blocks 104-3 and 104-4 contain null data. A sparseness optimization can be performed to create the virtual hard disk 102'. The virtual hard disk 102' includes the three blocks containing data 104-1, 104-2, and 104-5 and a block allocation table (BAT) 106. The BAT 106 can be used to reflect the actual structure of the virtual hard disk 102 by noting which blocks contain data and which blocks contain nulls. The virtual hard disk 102', as shown in FIG. 2, is stored at a local service 250. Notably, while FIG. 1 illustrates conversion from a virtual hard disk 102 to an optimized virtual hard disk 102' it should be appreciated that this conversion is not required, but rather an optimized virtual hard disk may be created in the first instance.

A remote blob 202 will likewise be sparse, because the prescribed format is based on a 1-1 mapping of disk pages to blob pages. However, the remote blob at the remote service 252 is not optimized for sparseness but rather includes both blocks containing data 204-1, 204-2 and 204-5 corresponding to the blocks 104-1, 104-2 and 104-5; as well as blocks containing nulls 204-3 and 204-4 corresponding to blocks 104-3 and 104-4 that were optimized away in the virtual hard disk 102'.

By integrating conversion and upload into the local service 250, the sparseness metadata stored in the BAT 106 in supported input formats is leveraged to improve upload performance. In particular, the sparseness metadata can be used to optimize what data is uploaded from the local service 250 to the remote cloud service 252. Rather than needing to upload an entire virtual hard disk 102, individual blocks containing data, such as blocks 104-1, 104-to in 104-5 can be uploaded to the blob 202 at the remote cloud service 252. For example, one or more HTTP 'PUT' requests 254 can be used to upload the block 104-1 to the block 204-1, the block 104-2 to the block 204-2, and the block 104-5 to the block 204-5.

On-the-fly conversion also improves parallelism, avoiding an otherwise slow up-front operation. For example, the blocks 104-1, 104-2 and 104-5 could each be uploaded to the remote service 252 and the blob 202 using each their own individual PUT request 254 such that the blocks could be uploaded in a parallel fashion.

Further, users do not typically use the 'fixed' virtual hard disk (VHD) formats (such as that illustrated by the virtual hard disk 102) for their virtualization needs. More often, the 'dynamic' and 'differencing' disk VHD formats are used. Dynamic and differencing disks bring numerous manageability benefits, and their use is well-integrated into various tools and operating systems, such as Hyper-V and Windows® 7 available from Microsoft® Corporation of Redmond Wash. On-front conversion to convert a dynamic word differencing disk to a fixed disk such as that illustrated by virtual disk 102, is slow, requires ample local disk space, and yields a duplicative artifact. By integrating conversion from dynamic and differencing disks formats to formats appropriate for the remote blob into the upload tool, users can work directly with their preferred disk format.

Thus, embodiments may implement format-aware uploads with automatic conversion to native cloud formats. Additionally or alternatively, embodiments may retain sparseness end-to-end.

Referring now to FIG. 2, additional details are illustrated. FIG. 2 illustrates a local service 250. The local service 250 may be, for example, and on premises service maintained by an enterprise. The local service 250 receives a number of inputs. The local service 250 receives a local file path, referring to a virtual hard disk (VHD) file 102' as generated by Hyper-V, Windows 7, or other compatible tool as an input. The local service 250 receives a remote blob URI, referring to a non-existent blob (for a new upload) or existing blob (in a resume case), such the blob as illustrated at 202 as an input. The local service 250 receives storage credentials, enabling the local service 250 to authenticate with a remote storage account at the remote service 252 as an input.

Embodiments may include one or more modules 256 at the local service 250 for parsing VHD file formats. The one or more modules 256 parse the local file's header (such as the BAT 106) and footer in accordance with a VHD specification, such as the VHD 1.0 specification.

In the examples illustrated herein, the VHD is classified as one of dynamic VHD, differencing VHD, or fixed VHD. An internal abstraction is generated, known as the virtual stream. The virtual stream provides a sparse, seekable view of the virtual hard disk in the native format, such as the format illustrated by the virtual hard disk 102. Input format considerations are encapsulated behind the virtual stream abstraction. Sparseness information is exposed as a list of block addresses understood to contain significant data. For example, the BAT 106 may identify the blocks 104-1, 104-2, and 104-5 as containing significant data.

The following illustrates implementations for the three types of VHD files, namely dynamic, differencing, and fixed virtual hard drives.

FIG. 2 illustrates an example using a dynamic virtual hard drive. For dynamic VHD, as noted above, the dynamic format contains a data structure known as the BAT. The BAT 106 provides a map of virtual blocks to physical blocks. The map is sparse in that not all virtual blocks have physical data and are understood to be empty. The virtual stream implementation surfaces sparseness data based on the BAT 106. When seeking and reading the virtual stream, the BAT 106 is likewise used. As illustrated in FIG. 2, PUT requests 254 can be used to send blocks 104-1, 104-2 and 104-5 containing data as indicated by the BAT 106.

Figure 3:
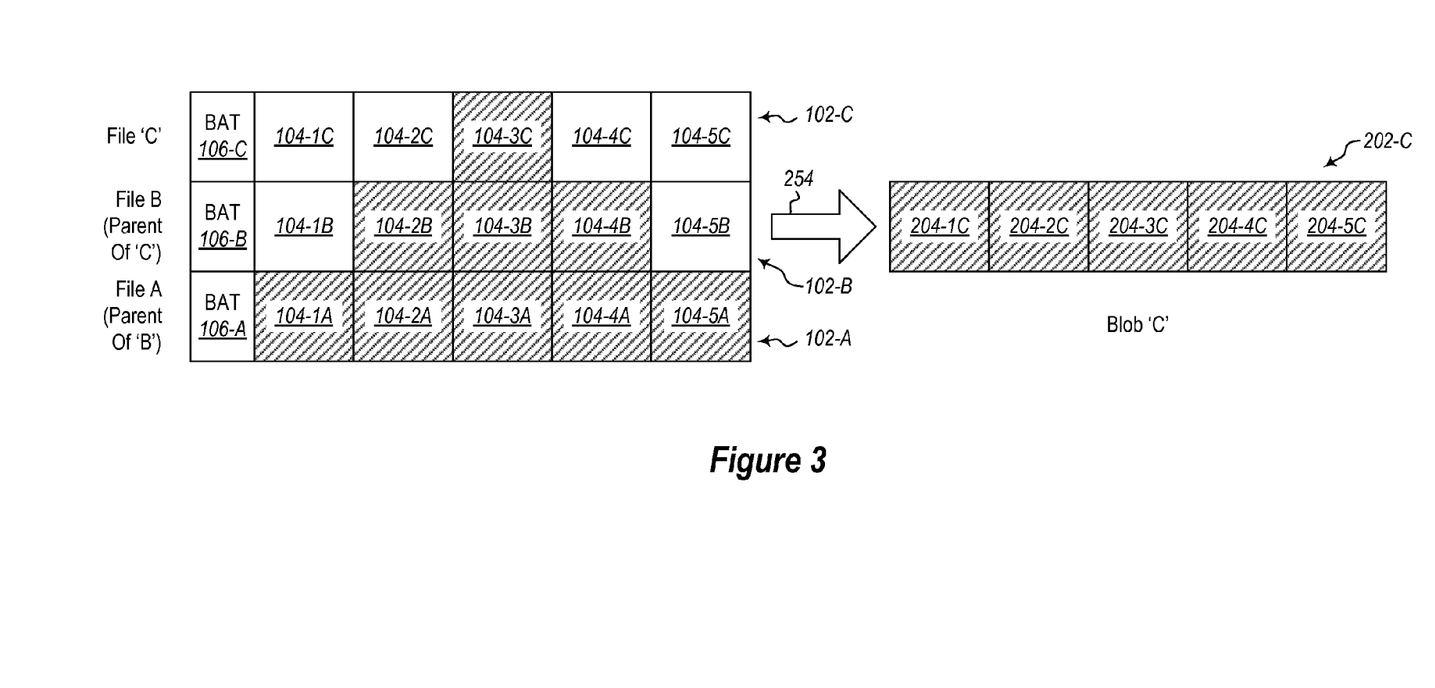
FIG. 3 illustrates a differencing virtual hard disk.

FIG. 3 illustrates an example of differencing VHD. For differencing VHD, the differencing format is an extension to the dynamic format. It contains a 'parent locator' structure, providing the location of a parent file (local). When the BAT does not contain a mapping for a given virtual block, the parent file may supply the information. The parent file itself may be any type of VHD file; if the parent is a differencing file, the process recurses. The virtual stream implementation encapsulates this process. Sparseness data may be based on the union of the entire parent tree.

In particular, FIG. 3 illustrates a virtual hard disk file 102-A that is the parent file of a virtual hard disk file 102-B, which is in turn the parent file to virtual hard disk file 102-C. Hard disk files 102-B and 102-C include differences from their parent files, but not redundant data that already exists in their parent files or earlier ancestor files. For data that is the same in the parent and child, reference can simply be made to the parent or an earlier ancestor for that information. In the example illustrated in FIG. 3, the shaded blocks represent data unique to a particular file while the unshaded blocks represent data that can be found in some hierarchical parent (including ancestor) file(s). For example, block 104-2B contains different data than block 104-2A. However, block 104-1B and block 104-1C contain the same data as in block 104-1A. Further, blocks 104-1B and 104-1C do not physically contain the data but rather refer to the parent file 102-A and the block 104-1A where the actual data can be found.

Note also that the differencing format may include BATs for one or more of the files as illustrated in FIG. 3. For example, FIG. 3 illustrates BATs 106-A, 106-B and 106-C. Because of the hierarchical nature of differencing format disks, the sparseness data contained in the BAT 106-A is preserved in the child files 102-B and 102-C. Each of the child files 102-B and 102-C includes a BAT to specify blocks that were not specified by the parent or supersede that of the parent.

To upload the virtual hard disk file 102-C to the remote service 252 to the blob 202-C, the block 104-1A is moved by a PUT request 254 to block 204-1C; the block 104-2B is moved to the block 204-2C; the block 104-3C is moved to the block 204-3C the block 104-4B is moved to the block 204-4C; and the block 104-5A is moved to the block 204-5C.

When a fixed VHD is implemented at the local service 250, the fixed format is passed through, as it is the native format. The format offers no sparseness information. However, embodiments may be implemented where the virtual stream implementation scans for large pockets of nulls to generate sparseness data. If this sparseness data can be identified, the large pockets of nulls can be prevented from being uploaded to the remote service 252.

Note that in some embodiments, for dynamic and differencing files, the virtual stream synthesizes a VHD footer in 'fixed' format.

Embodiments may include one or more modules for initializing the Remote Blob (such as blob 202). The remote blob may be created, entirely empty (e.g., with null data) but with an established size in accordance with the fixed VHD format. By creating the remote blob entirely empty, there is no need to upload empty data from the local service 250 to the remote service 252.

Embodiments may include modules for uploading. The list of significant blocks, as per the virtual stream abstraction, is subdivided amongst a number of worker threads. Each thread proceeds to seek to an assigned block, read the block, then issue an HTTP PUT request to the remote storage service. The PUT request contains a range header that indicates to the storage service where the block should be placed within the blob. Retries are issued as necessary to recover from transient errors. Eventually, all significant blocks have been transferred and the process terminates.

Embodiments may include modules configured for resuming. Given that an upload may take hours or even days to complete, the client-code component supports resume. The resume process works like the normal upload process, except that the already-uploaded blocks are subtracted from the list of substantial blocks. The list of already-uploaded blocks may obtained from the remote storage service 252.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
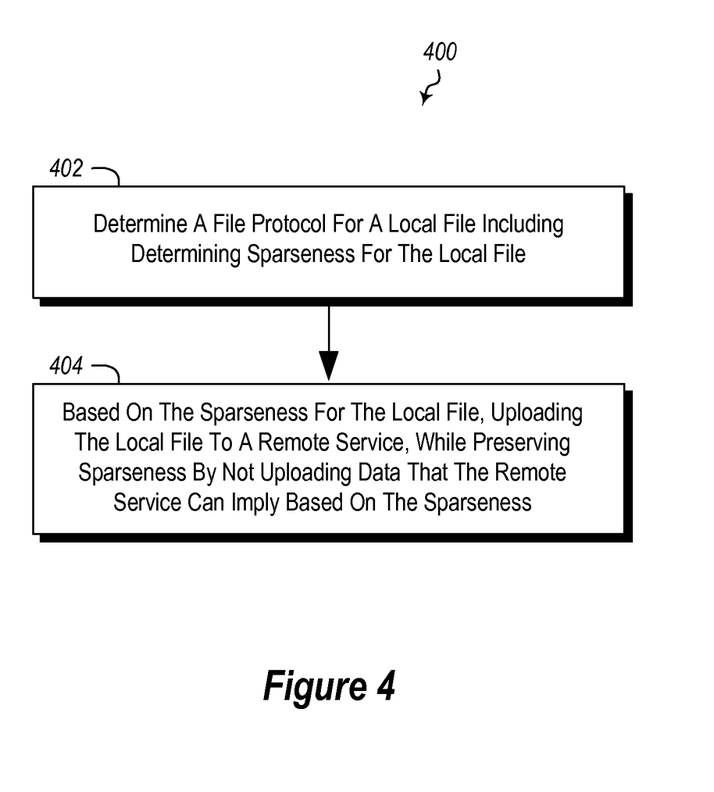
FIG. 4 illustrates a method of uploading storage data.

Referring now to FIG. 4, a method 400 is illustrated. The method 400 may be practiced in a distributed or cloud computing environment. The method 400 includes acts for uploading storage data. The method 400 includes determining a file protocol for a local file including determining sparseness for the local file (act 402). For example, the sparseness may be defined using a native sparseness format. One way of accomplishing this may be embodiments where the sparseness is defined using a protocol that captures a dynamic format. As illustrated above, the use of BATs can be used in a dynamic protocol to capture sparseness information. In some embodiments sparseness is preserved using a differencing disk protocol for a parent disk that comprises sparseness. For example, as illustrated in FIG. 3, sparseness of file 102-C is preserved using the BAT of file 102-A. Alternatively or additionally, the sparseness may be determined by scanning the local file to find sparseness. For example, embodiments may include functionality to locate blocks of nulls in a file so as to identify those blocks as contributing to the sparseness of the file.

The method 400 further includes, based on the sparseness for the local file, uploading the local file to a remote service, while preserving sparseness by not uploading data that the remote service can imply based on the sparseness (act 404) For example, blocks of data in a file that only contain null data can be identified and those blocks are not uploaded to a blob at the remote service.

As illustrated above, embodiments of the method 400 may be practiced where the local file includes data for an entire physical disk.

The method 400 may further include determining interior portions of data in the file, such as blocks, that do not need to be uploaded to the remote service by using a differencing format. For example, child virtual hard disks hide certain portions of parent virtual hard disks (in the typical fashion of differencing disks), making upload of those blocks unnecessary.

Figure 5:
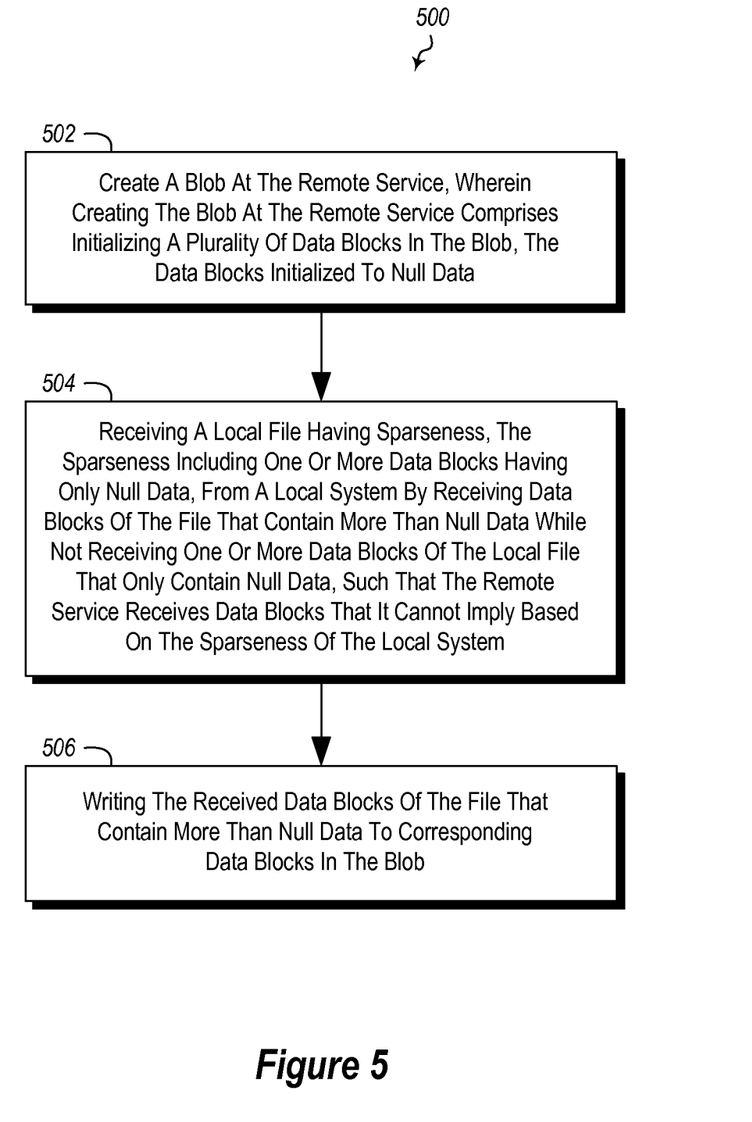
FIG. 5 illustrates a method of efficiently receiving uploaded storage data at a remote service.

Referring now to FIG. 5, a method 500 is illustrated. The method 500 may be practiced in a distributed or cloud computing environment and includes acts for efficiently receiving uploaded storage data at a remote service by not requiring null data from a local system to be uploaded. The method 400 includes creating a blob at the remote service. Creating the blob at the remote service comprises initializing a plurality of data blocks in the blob where the data blocks are initialized to null data (act 502). The created blob is created at a remote service for a corresponding local file at a local system. Thus, the blob will have data blocks corresponding to data blocks in the local file, although the local file will have data blocks with significant data and null data, the blob will have corresponding data blocks with null data until the local file has been uploaded to the remote service and into the blob, irrespective of what is in the data blocks of the local file.

The method 500 further includes receiving a local file having sparseness, the sparseness including one or more data blocks having only null data, from a local system by receiving data blocks of the file that contain more than null data while not receiving one or more data blocks of the local file that only contain null data, such that the remote service receives data blocks that it cannot imply based on the sparseness of the local system (act 504). For example, the remote service may receive only blocks that have data other than null data in them. This may be accomplished by the local service issuing a PUT request to the remote service for each block that needs to be uploaded to the remote service.

The method 500 further includes writing the received data blocks of the file that contain more than null data to corresponding data blocks in the blob (act 506). For example, as shown in FIG. 3, when block 104-3C is received, that data is written to block 204-3C.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed or cloud computing environment, a method for a computing system uploading storage data from a local virtual hard disk to a remote cloud stored blob, the method comprising:

the computing system determining a file protocol for a local virtual hard disk file including determining sparseness for the local file, the determined sparseness identifying one or more data blocks having null data, the computing system including at least one processor;

the computing system, based on the sparseness for the local virtual hard disk file, creating an optimized local virtual hard disk file that includes data blocks having data and that omits data blocks having null data and such that the optimized local virtual hard disk file contains fewer data blocks than the local virtual hard disk file, the optimized virtual hard disk file also including or being used with a block allocation table to identify the data blocks having the null data; and uploading the optimized local virtual hard disk file to a remote service, while preserving sparseness by refraining from uploading the one or more data blocks having the null data that were omitted from the optimized local virtual hard disk file, wherein the optimized local virtual hard disk file is subsequently used to create a remote cloud stored blob that replicates the local virtual hard disk file with corresponding sparseness and one or more data blocks having null data and such that the remote cloud stored blob includes a same number of data blocks as the virtual hard disk file but more data blocks than the optimized local virtual hard disk file.

2. The method of claim 1, wherein the sparseness is defined using a protocol that captures a dynamic format.

3. The method of claim 1, wherein the sparseness is defined using a native sparseness format.

4. The method of claim 1, wherein the sparseness is determined by scanning the local virtual hard disk file to find sparseness.

5. The method of claim 1, wherein the local virtual hard disk file comprises data for an entire physical disk.

6. The method of claim 1, wherein sparseness is preserved using a differencing disk protocol for a parent disk that comprises sparseness.

7. The method of claim 1, further comprising determining interior portions of data in the virtual hard disk file that do not need to be uploaded to the remote service by using a differencing format.

8. The method of claim 1, wherein bandwidth required for uploading the data from the local system comprising the optimized local virtual disk file is smaller than a bandwidth that would be required to upload the entire local virtual disk file prior to optimization during which the null data was removed from the local virtual disk file.

9. In a distributed or cloud computing environment, an method for a computing service system efficiently receiving an upload of a local virtual disk file at a remote service in the form of an optimized local virtual disk file by not requiring null data from the virtual disk file to be uploaded during the upload even though the virtual disk file contains data blocks with the null data, the method comprising:

the computing system creating a blob at the remote service, wherein creating the blob at the remote service comprises initializing a plurality of data blocks in the blob, the data blocks being initialized to null data, the computing system including at least one processor;

the computing system receiving an upload of data from a local system for a local virtual disk file, wherein the local virtual disk file includes one or more data blocks having only null data, and wherein receiving the upload of data includes receiving an optimized local virtual disk file from the local system, the optimized local virtual disk file including data blocks of the local virtual disk file that contain data other than the null data and the optimized local virtual disk file omitting one or more data blocks of the local file that only contain null data, such that the optimized local virtual disk file contains fewer data blocks than the local virtual disk file, the optimized local virtual disk file also including or being used with a block allocation table to identify the data blocks having the null data; and the computing system writing the received data blocks of the file that contain more than null data to corresponding data blocks in the blob, wherein the blob replicates the local virtual disk file with corresponding sparseness and one or more data blocks having null data and such that the blob includes a same number of data blocks as the virtual hard disk file but more data blocks than the optimized local virtual hard disk file.

10. The method of claim 9, wherein the blob comprises data for an entire physical disk.

11. The method of claim 9, wherein receiving data blocks of the local virtual disk file that contain more than null data comprises receiving one or more HTTP PUT requests for data blocks.

12. The method of claim 9, wherein the local virtual disk file is received from a local system that preserves sparseness using a differencing disk protocol for a parent disk that comprises sparseness.

13. The method of claim 9, wherein the local file is received from a local system that identifies sparseness using a dynamic format.

14. The method of claim 9, wherein the local file is received from a local system that identifies sparseness by scanning local files.

15. The method of claim 9, wherein the optimized local virtual disk file includes the block allocation table which is also configured to identify the one or more data blocks that only contain null data.

16. A system configured with an upload tool for uploading local storage data to a remote service, the local data having sparseness, and the upload tool optimized to reduce the amount of data uploaded by taking into account the sparseness of the local data, the system comprising:

one or more processors; and one or more computer readable medium, wherein the one or more computer readable medium comprise computer executable instructions that when executed by the one or more processors cause at least one of the one or more processors to implement:

a first module configured to understand various local storage protocols and a remote storage protocol, the first module configured to determine sparseness of local files, the determined sparseness identifying one or more data blocks having null data; and a second module configured to upload local files to a remote service by taking into account sparseness of local files by refraining from uploading data blocks having the null data to the remote service during the upload of the local files and that also includes, based on the sparseness for the local files, creating one or more corresponding optimized local files that each includes data blocks having data and that omits data blocks having null data and such that the one or more corresponding optimized local files contain fewer data blocks than the local files, each of the one or more corresponding optimized local files also including or being used with one or more corresponding block allocation tables to identify the data blocks having the null data, and the second module uploading the one or more corresponding optimized local files to the remote service, while preserving sparseness of the local files by refraining from uploading the one or more data blocks having the null data that were omitted in the one or more corresponding optimized local files, wherein the one or more corresponding optimized local files are used to create one or more corresponding remote cloud stored blobs during the uploading, the one or more corresponding remote cloud stored blobs replicating the local files with corresponding sparseness and one or more data blocks having null data and such that the one or more corresponding remote cloud stored blobs include a same number of data blocks as the local files but more data blocks than the corresponding one or more optimized local files.

17. The system of claim 16, wherein the sparseness is defined using a protocol that captures a dynamic format.

18. The system of claim 16, wherein the sparseness is defined using a native sparseness format.

19. The system of claim 16, further comprising a module configured to determine sparseness by scanning the local files to find sparseness.

20. The system of claim 16, wherein the local files comprises data for an entire physical disk.

21. The system of claim 16, wherein sparseness is preserved using a differencing disk protocol for a parent disk that comprises sparseness.

22. The system of claim 16, further comprising determining interior portions of data in the file that do not need to be uploaded to the remote service by using a differencing format.

* * * * *